United States Patent [19]

Endo et al.

[11] Patent Number: 5,032,964

[45] Date of Patent: Jul. 16, 1991

[54] HEADLIGHT FOR MOTOR VEHICLE

[75] Inventors: Masayasu Endo; Noboru Koike, both of Shizuoka, Japan

[73] Assignee: Koito Manufacturing Co., Ltd., Tokyo, Japan

[21] Appl. No.: 605,295

[22] Filed: Oct. 30, 1990

[30] Foreign Application Priority Data

Nov. 13, 1989 [JP] Japan .................. 1-292265

[51] Int. Cl.⁵ .................................. B60Q 1/04
[52] U.S. Cl. .............................. 362/61; 362/66; 362/275; 362/287; 362/419; 33/335
[58] Field of Search ............... 362/61, 66, 80, 418, 362/419, 420, 421, 287, 288, 289, 285, 269, 274, 275; 33/288, 335, 644, 645, 678

[56] References Cited

U.S. PATENT DOCUMENTS

| | | | |
|---|---|---|---|
| 4,628,414 | 12/1986 | Ricard | 362/419 |
| 4,794,495 | 12/1988 | McMahan et al. | 362/419 |
| 4,802,067 | 1/1989 | Ryder et al. | 33/335 |
| 4,901,208 | 2/1990 | DePetro | 362/66 |
| 4,922,387 | 5/1990 | Ryder et al. | 362/31 |
| 4,970,629 | 11/1990 | McMahan | 362/61 |

Primary Examiner—Ira S. Lazarus
Assistant Examiner—Sue Hagarman
Attorney, Agent, or Firm—Sughrue, Mion, Zinn, Macpeak & Seas

[57] ABSTRACT

A vehicular headlight which does not require a large amount of equipment to properly adjust the angle of the azimuthal direction of emission of light from the headlight. A reflector within the body of the headlight is adjustable relative to a vertical axis and horizontal axis to control the direction in which light is emitted from the headlight. The headlight further includes aiming devices for measuring the aiming angle relative to the vertical axis and horizontal axis.

11 Claims, 8 Drawing Sheets

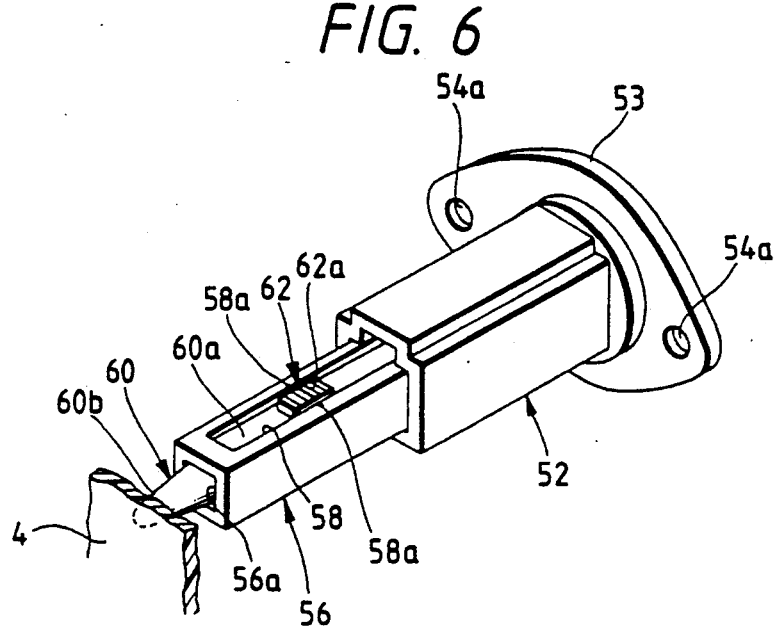
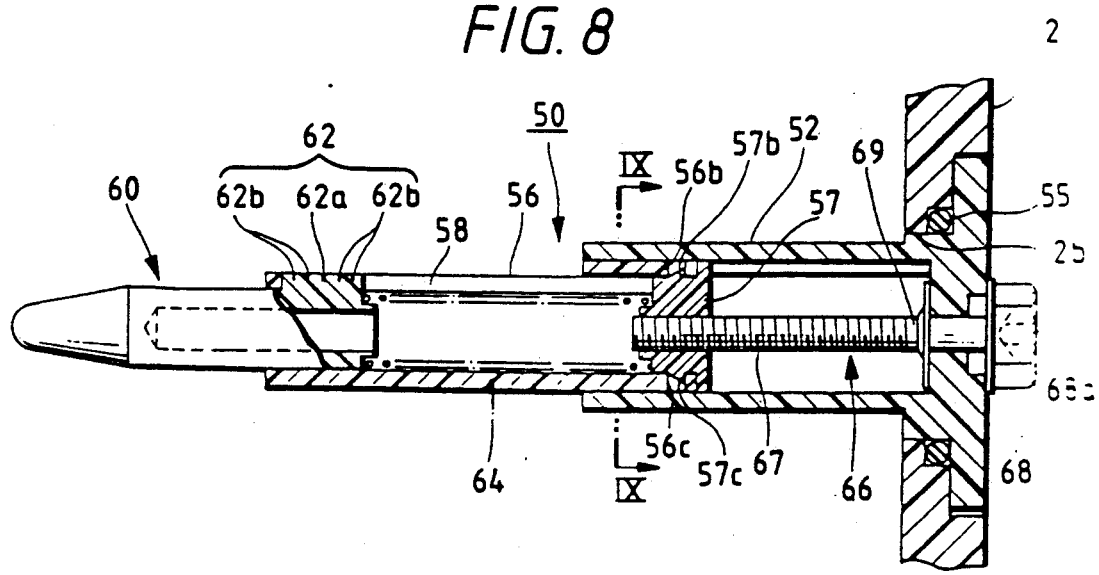

HEADLIGHT FOR MOTOR VEHICLE

BACKGROUND OF THE INVENTION

The present invention relates to a headlight for a motor vehicle which incorporates an aiming device which permits the ready determination of whether the angle of the azimuthal direction of emission of light from the headlight is proper so as to allow the headlight to be easily adjusted to make the angle proper.

A conventional headlight is provided with an aiming mechanism by which the headlight can be swung about a prescribed horizontal axis and about a prescribed vertical axis to perform an aiming adjustment of the headlight so that the angle of the direction of emission of light therefrom is set in a prescribed range. For the aiming adjustment, the headlight is lit in a dark room and directed toward a screen located a prescribed distance from the headlight, and the adjustment is carried out until the resulting spot of light on the screen is set at a prescribed position. This conventional method of aiming adjustment requires a large amount of equipment, such as the dark room and the screen. This is a problem. Moreover, since the aiming adjustment must be performed while the spot of the light on the screen is being examined and adjusted to the prescribed position, the adjustment is time consuming This is also a problem.

Conventional headlights used in the United States generally have three location bosses on the front lens of the headlight which define a measurement reference surface. A measuring device, generally referred to as an aimer, is set in contact with the location bosses to check whether the headlight has an inclination with respect to the horizontal plane. When a motor vehicle equipped with the headlight is on a horizontal surface, the front surfaces of the location bosses should be in a vertical plane if the headlight is properly adjusted. For this reason, the angle of inclination of the headlight with respect to the horizontal plane can be measured if the front surfaces of the location bosses are used as reference contact surfaces for the measuring device. The measured angle of inclination is required to be in a prescribed range when the headlight is properly adjusted. Because such headlights used in the United States must have such location bosses, they must be manufactured differently from those to be used in Japan and Europe. This too is a problem.

SUMMARY OF THE INVENTION

The present invention was made in order to solve the above-mentioned problems.

Accordingly, it is an object of the present invention to provide a headlight for a motor vehicle which does not require a large amount of equipment such as a dark room, a screen, and a measuring device (aimer) for adjusting the headlight. It is a further object of the invention to provide such a headlight which has a simple construction which makes it possible to easily determine whether the angle of the azimuthal direction of the light emitted from the headlight is proper, and in which the angle can be easily adjusted.

A headlight of the invention embodied as a headlight of the movable reflector type, in which a reflector separate from the body of the headlight is adjustable relative to the body, is constituted and operated as hereinafter described.

An aiming device for measuring the angle of the reflector with respect to the vehicle body about a vertical axis is provided between the headlight body and the reflector. The device includes a tubular fixed holder, a tubular movable holder, a slider, and a movable holder position adjusting screw. The fixed holder is secured to the headlight body and extends in the front-to-rear direction of the headlight. The movable holder is inserted in the fixed holder and projects at the tip of the movable holder forward from the fixed holder. The slider is inserted in the movable holder and pushed by a spring provided in the movable holder so that the tip of the slider projects forward from the movable holder and is kept in contact with the back of the reflector and the slider can be slid backward and forward in conjunction with the aiming movement of the reflector about the vertical axis. The movable holder position adjusting screw is supported by the fixed holder; it has a male threaded tip portion inserted in the fixed holder and is engaged in the tapped hole of the movable holder; it also has a rear end portion projecting backward from the fixed holder having a turning manipulation part. The portion of the movable holder which projects forward from the fixed holder has a longitudinal slot. An index is provided on the portion of the movable holder at the side of the slot. Another index corresponding to the former index is provided on the portion of the slider which is exposed in the slot. The angle of the aiming of the reflector about the vertical axis is read in terms of the distance between the two indices. The amount of slide of the slider, which is slid by the aiming of the reflector about the vertical axis, corresponds to the aiming angle of the reflector about the vertical axis and to the distance between the index on the movable holder and that on the slider. Therefore, the aiming angle of the reflector about the vertical axis can be detected in terms of the distance between the indices, that is, the angle of the azimuthal direction of emission of the light from the headlight can be detected in terms of the distance.

The slider is pushed by the spring so that the tip of the slider is kept in contact with the reflector. When the movable holder position adjusting screw is turned, the movable holder is moved backward or forward in the fixed holder relative to the slider so that the index on the movable holder is displaced relative to the index on the slider. The position of the index on the movable holder is made coincident in advance with that of the index on the slider by turning the adjusting screw. As a result, the aiming angle of the reflector about the vertical axis can be read in terms of the distance between the two indices. If the positions of the two indices are not coincident with each other, an adjustment can be easily carried out to make the positions coincident again by turning the adjusting screw.

A headlight of the invention embodied as a headlight of the movable unit type, in which the body and reflector unit are constituted by a mutually integrated body and reflector adjustable relative to a headlight housing, is constituted and operated as described hereinafter.

An aiming device for measuring the angle of the vehicle body and reflector unit about a vertical axis is provided between the headlight housing and the unit. The device includes a tubular fixed holder, a tubular movable holder, a slider, and a movable holder position adjusting screw. The fixed holder is secured to the headlight housing and extends in the front-to-rear direction of the headlight. The movable holder is inserted in the fixed holder and projects at the tip of the movable holder forward from the fixed holder. The slider is inserted in the movable holder and pushed by a spring provided in the movable holder so that the tip of the slider projects forward from the movable holder and is kept in contact with the back of the unit, and the slider can be slid backward and forward in conjunction with the aiming of the unit about the vertical axis. The movable holder position adjusting screw is supported by the fixed holder; it has a male threaded tip portion inserted in the fixed holder and is engaged in the tapped hole of the movable holder; and it also has a rear end portion projecting backward from the fixed holder having a turning manipulation part. The portion of the movable holder which projects from the fixed holder has a longitudinal slot. An index is provided on that portion of the movable holder at the side of the slot. Another index corresponding to the former index is provided on the portion of the slider exposed in the slot. The aiming angle of the unit about the vertical axis is read in terms of the distance between the two indices. The amount of slide of the slider, which is slid by the aiming operation of the unit about the vertical axis, corresponds to the aiming angle of the unit about the vertical axis and to the distance between the index on the movable holder and that on the slider. Therefore, the aiming angle of the unit about the vertical axis can be detected in terms of the distance between the indices, that is, the angle of the azimuthal direction of emission of light from the headlight can be read in terms of the distance between the indices. The slider is pushed by the spring so that the tip of the slider is kept in contact with the unit. When the movable holder position adjusting screw is turned, the movable holder is moved backward or forward in the fixed holder relative to the slider so that the index on the movable holder is displaced relative to the index on the slider. The position of the index on the movable holder is made coincident in advance with that of the index on the slider by turning the adjusting screw. As a result, the aiming angle of the unit about the vertical axis can be read in terms of the distance between both the indices. If the positions of the two indices for some reason become not coincident with each other, an adjustment can be easily carried out make the positions coincident with each other again by turning the adjusting screw.

BRIEF DESCRIPTION OF THE DRAWINGS

FIG. 6 is a perspective view of the horizontal aiming device of the headlight;

FIG. 8 is a vertical sectional view of the device;

DESCRIPTION OF THE PREFERRED EMBODIMENTS

Figure 1:
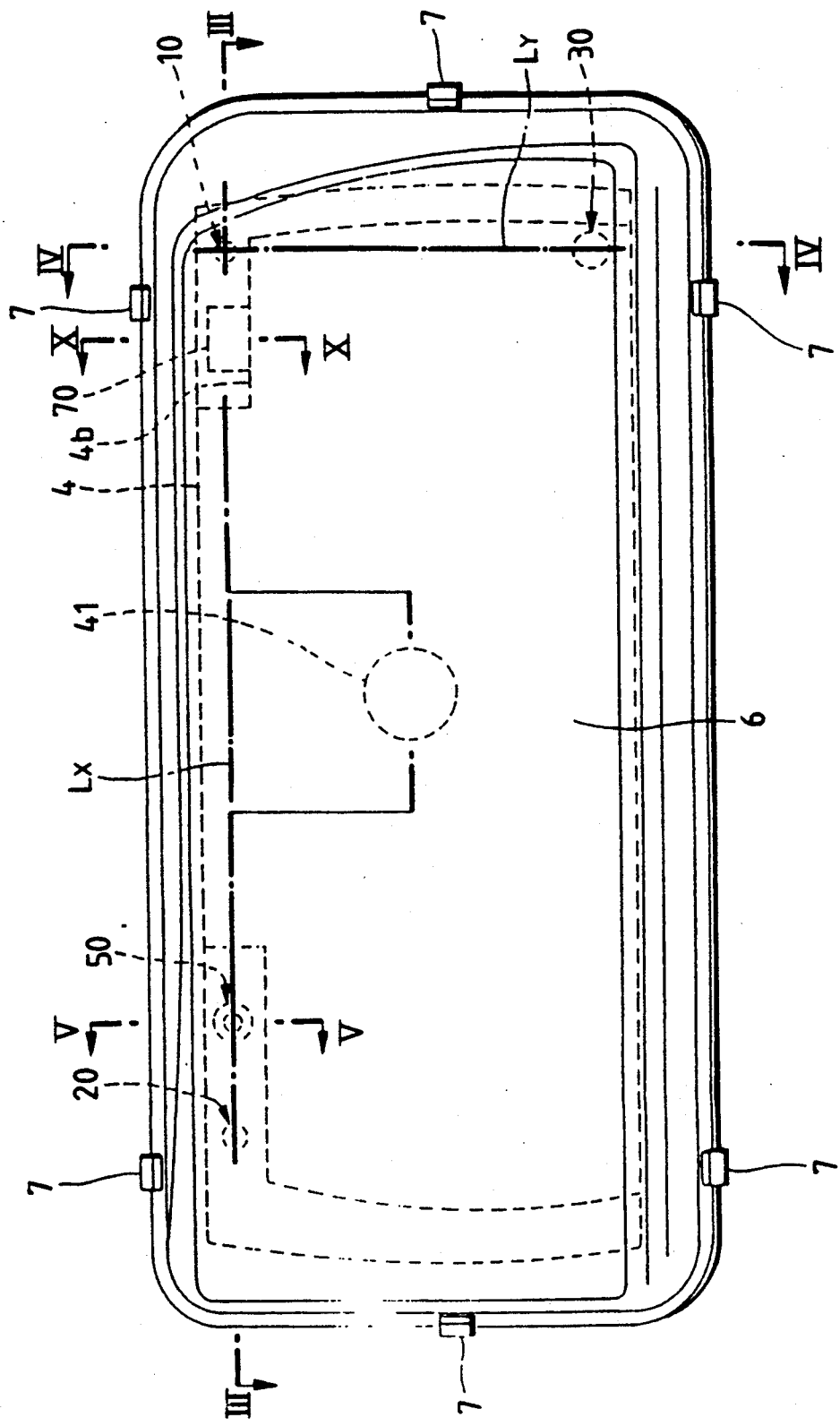
FIG. 1 is a front view of a headlight constructed in accordance with a preferred embodiment of the present invention, having a light emission angle adjuster and which is of the movable reflector type.

Preferred embodiments of the present invention are hereafter described in detail with reference to the drawings attached hereto.

FIGS. 1-10 show a headlight for a motor vehicle constructed according to a preferred embodiment of the present invention. In this embodiment, the headlight is of the movable reflector type. The headlight includes a headlight body 2, a reflector 4 mounted in the headlight body, a front lens 6 fitted over the oblong front opening of the body, a first aiming device 50, and a second aiming device 70. The body 2, the reflector 4 and the front lens 6 are integrally coupled with each other.

Figure 3:
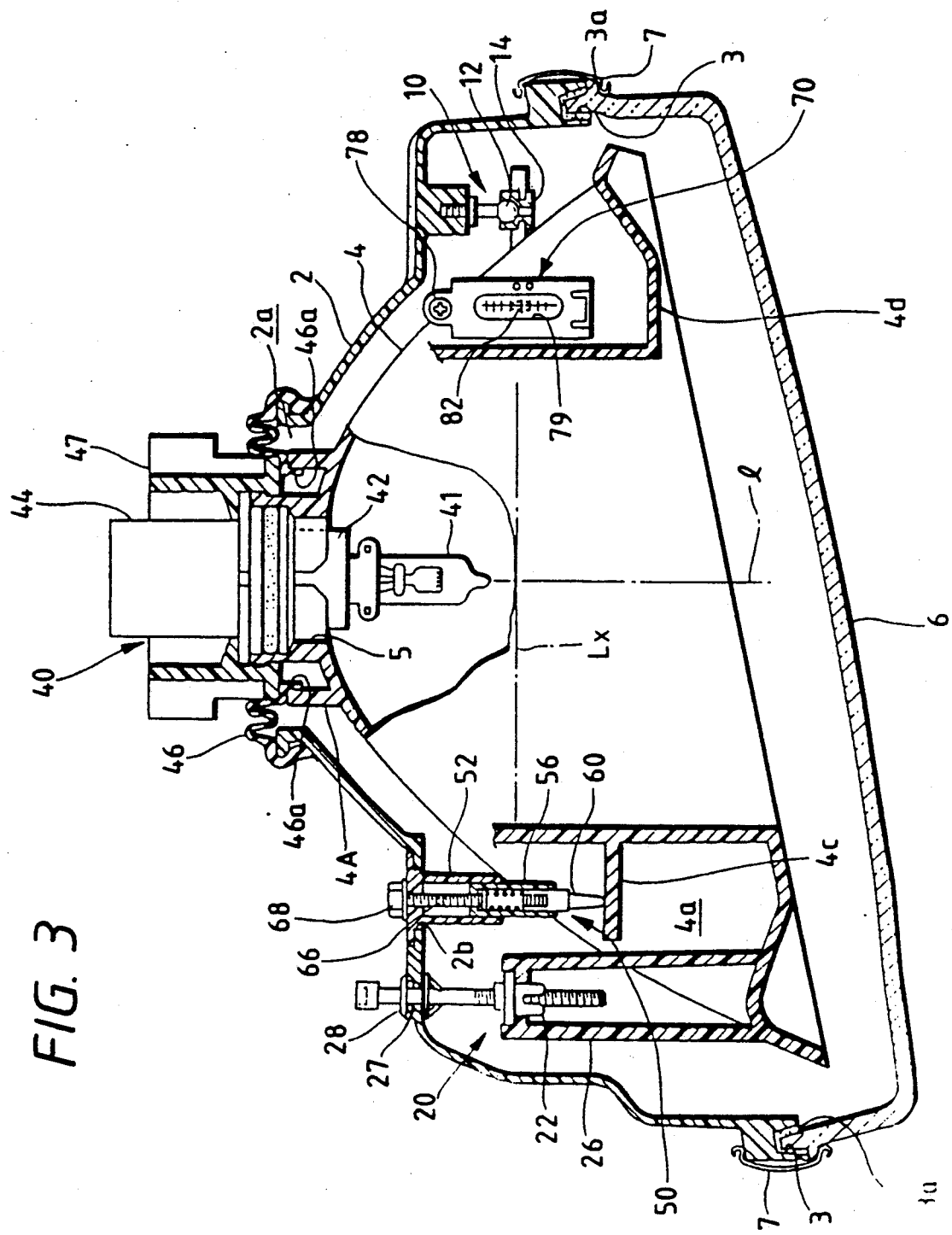
FIG. 3 is a horizontal sectional cutaway view of the headlight taken along a line III—III in FIG. 1.
Figure 4:
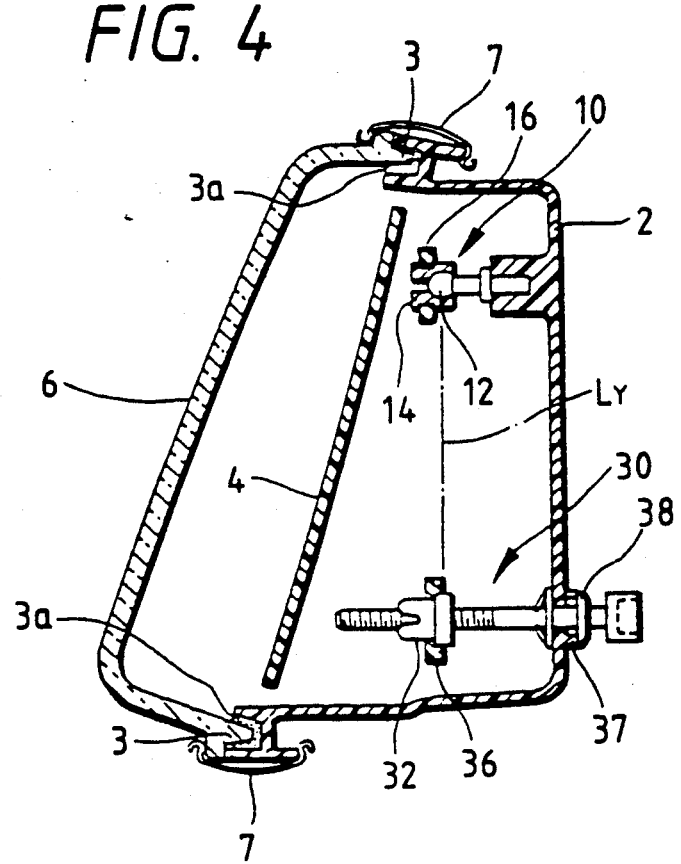
FIG. 4 is a vertical sectional view of the headlight taken along a line IV—IV in FIG. 1.

As shown in FIGS. 1, 3 and 4, the reflector 4 is supported at three points by a ball joint 10 and adjusting screws 20 and 30. The ball joint 10 is supported at the ball 12 thereof by the headlight body 2 so that the reflector 4 can be swung about the ball joint 10. The adjusting screws 20 and 30 are rotatably supported by the body 2 and engaged in nuts 22 and 32 attached to the reflector 4, so that the screws can be turned to move the nuts backward and forward on the screws to change the aiming angle of the reflector. The ball 12 of the ball joint 10 is supported by a socket 14 secured to a bracket 16 secured to the rear of the reflector 4. The nuts 22 and 32 are supported by brackets 26 and 36 secured to the rear of the reflector 4. Compressed springs 24 and 34, 0-rings 27 and 37, and flanges 28 and 38 projecting from the adjusting screws 20 and 30 are further provided in the headlight. The point of the reflector 4 at whiCh the reflector is supported by the adjusting screw 20 and the nut 22 is on a horizontal axis Lx perpendicularly intersecting the optical axis 1 of the bulb 41 of the headlight and extending through the ball joint 10. The point of the reflector 4 at which the reflector is supported by the other adjusting screw 30 and the nut 32 is on a vertical axis Ly perpendicularly intersecting the optical axis 1 and the horizontal axis Lx and extending through the ball joint 10. Therefore, the reflector 4 can be swung about the vertical axis Ly by turning the adjusting screw 20 to adjust the horizontal angle of the reflector, that is, to adjust the angle of the azimuthal direction of emission of light from the headlight. The reflector can also be swung about the horizontal axis Lx by turning the other adjusting screw 30 to adjust the vertical angle of the reflector, that is, to adjust the angle of the elevational direction of emission of light from the headlight. Thus, the aiming angle of the reflector 4, that is, the direction of emission of light from the headlight, can be adjusted by turning the adjusting screws 20 and 30.

Shown at 40 in FIG. 3 is a bulb socket integrally coupled with the bulb 41. The rear of the headlight body 2 has an opening 2a for attaching and detaching the bulb socket 40, which is fitted into a socket hole 5 in the rearmost portion of the reflector 4 through the opening 2a in the rear of the headlight body. A rubber cover 46 is fitted around the rearmost pOrtion of the reflector 4 so as to close the gap between the reflector and the headlight body 2. The bulb socket 40 is pushed and secured in the socket hole 5 of the body 2 by a locking cap 47 provided around the socket. The inner circumferential rear portion 4A of the reflector 4 by the locking cap 47 so that the edge is in tight contact with the portion. The bulb 41 is fitted with a metal base 42.

Electric connection terminals are provided in a cylindrical connector 44.

Figure 2:
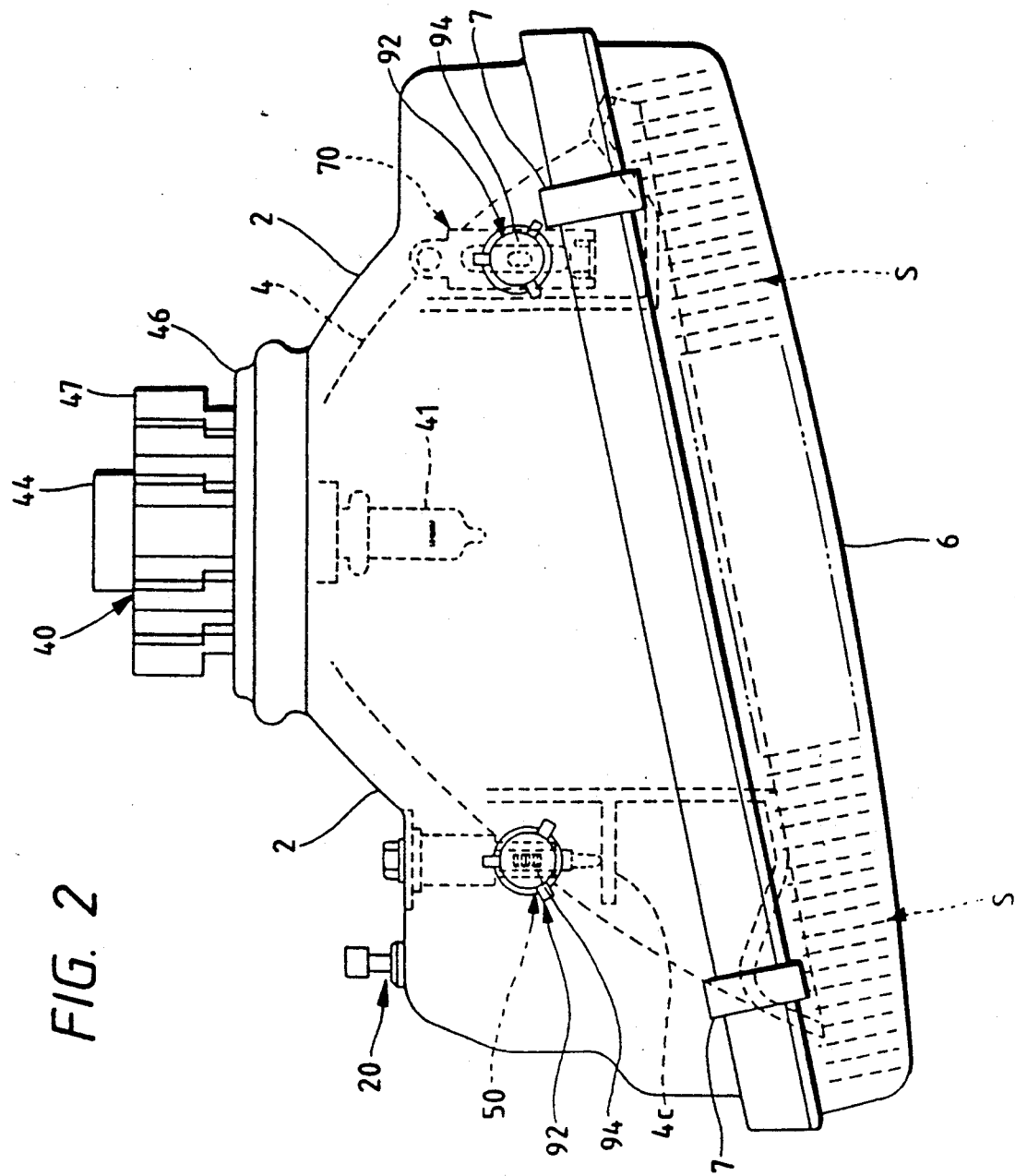
FIG. 2 is a plan view of the headlight.

Shown at 3 in FIGS. 3 and 4 is a sealing groove filled with a sealant 3a so that the peripheral edge of the front lens 6 is engaged in the groove. Shown at 7 in FIGS. 1, 2, 3 and 4 is a clip for mechanically clamping the front lens 6 and the headlight body 2 on each other. Also shown in FIG. 2 are diffusion steps S formed on the inside of the peripheral portion of the front lens 6 so that light leaking through the portion is made inconspicuous.

The first aiming device 50 shown in FIGS. 1, 2, 3, 5 and 8 is provided on a horizontal plane containing the horizontal axis Lx and is used for measuring the horizontal angle of the reflector 4, that is, for measuring the angle of the azimuthal direction of emission of light from the headlight. As shown in detail in FIGS. 5-9, the first aiming device 50 includes a tubular fixed holder 52 secured in the rear wall of the headlight body 2 and extending through the wall, a tubular movable holder 56 inserted in the fixed holder 52 and slidable therein backward and forward, a rod-like slider 60 inserted in the movable holder 56 and slidable therein backward and forward, a compressed helical spring 64 provided in the movable holder and urging the slider in such a direction as to project from the opening 56a of the front end of the movable holder, and a zero point adjusting screw 66 which is a movable holder position adjusting screw and is supported by the rear end of the fixed holder. The zero point adjusting screw has a male threaded tip portion 67 inserted into the fixed holder and is engaged in the tapped hole of the movable holder.

The fixed holder 52 is shaped as a tube of rectangular cross section with an opening at the front end of the fixed holder 52 and a flange 53 extending from the rear end of the body of the fixed holder 52. The fixed holder 52 is fitted in the opening 2b of the rear wall of the headlight body 2 and secured thereto by screws 54 inserted through the holes 54a of the holder. A seal 55 is provided between the fixed holder 52 and the headlight body 2 to seal the gap 2b therebetween.

Figure 7:
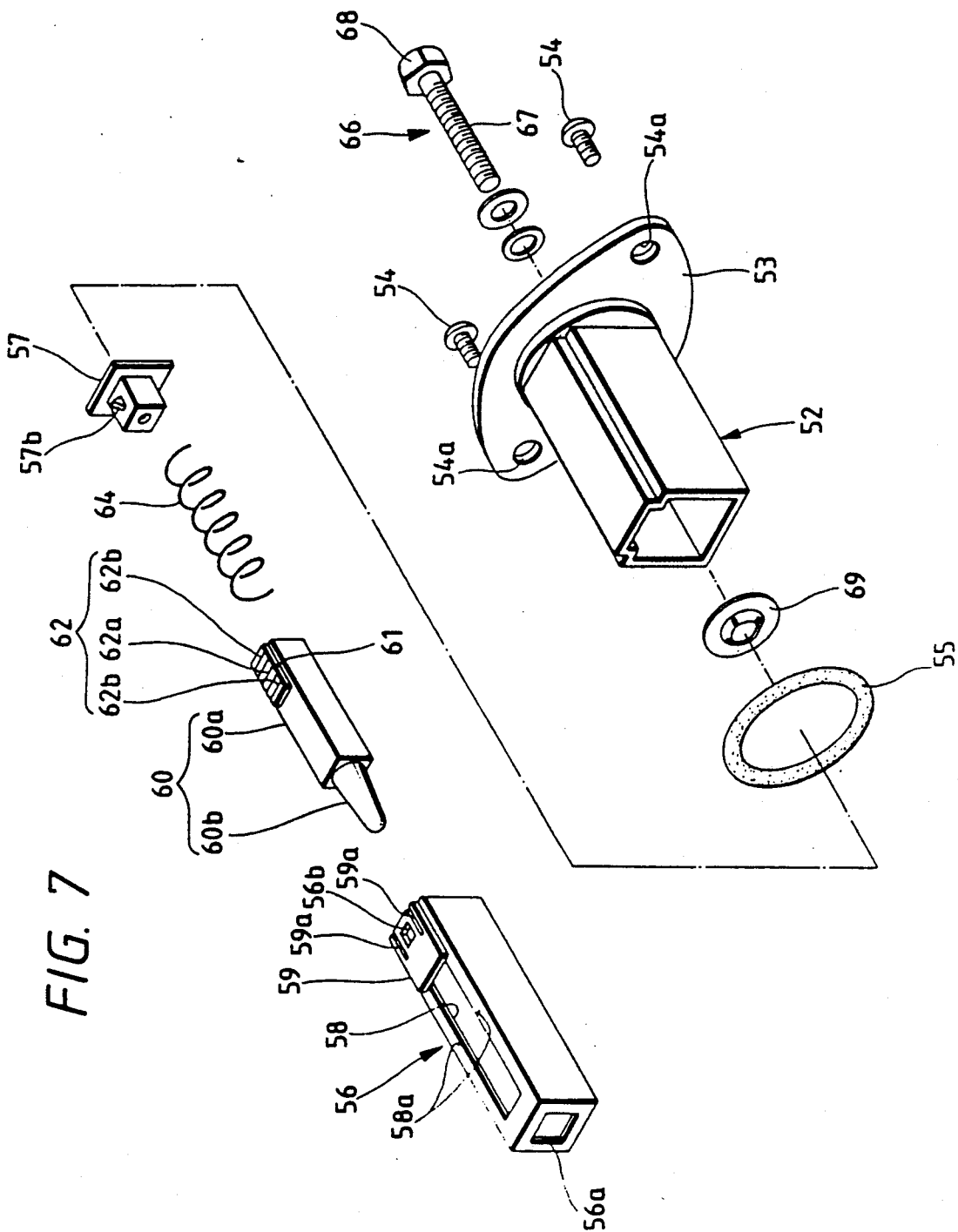
FIG. 7 is a perspective exploded view of the device.
Figure 9:
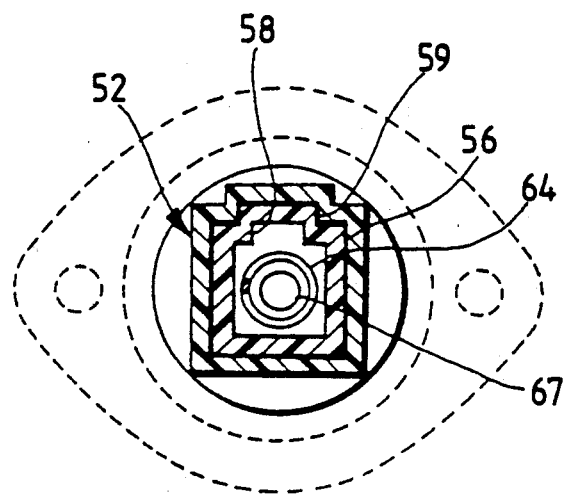
FIG. 9 is a horizontal sectional view of the device.
Figure 10:
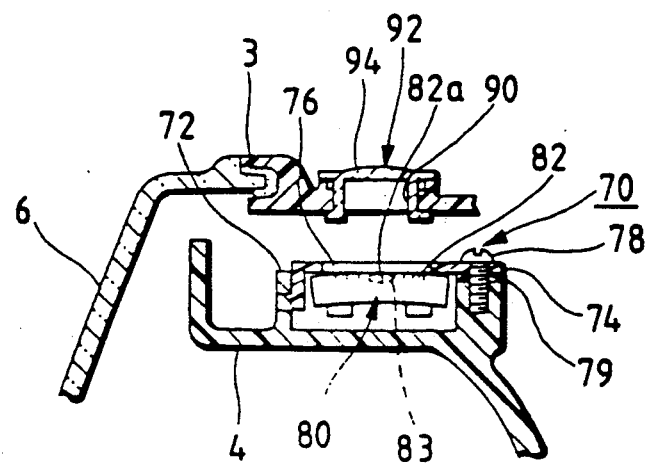
FIG. 10 is a vertical sectional view of the vertical aiming device section of the headlight.

The movable holder 56, which is shaped as a tube of rectangular cross section to correspond to the form of the inside of the fixed holder 52, has an opening 56a in the front end of the movable holder, wherein the tip of the slider 60 projects from the opening. The upper portion of the movable holder 56 has a longitudinal slot 58 extending in the front-to-rear direction of the headlight. A graduated plate 61 on the slider 60 is fitted in the slot 58 so as to be flush with the top of the movable slider 56. A spring pusher 57 is tightly fitted in the opening of the rear end of the movable holder 56. The bottom of the inside of the rear end portion of the movable holder 56 and a horizontal plate 59 on the longitudinal slot 58 of the movable holder have engagement holes 56b and 56c in which the engagement projections 57b and 57c of the spring pusher 57 are engaged. After the slider 60 and the compressed helical spring 64 are put in the movable holder 56, the spring pusher 57 is press-fitted forward into the movable holder. Thus, the movable holder 56, the spring pusher 57, the slider 60 and the compressed helical spring 64 can be easily assembled. As shown in FIG. 7, the horizontal plate 59 has slots 59a which extend at both sides of the engagement hole 56b in the front-to-rear direction of the headlight and act to increase the flexibility of the plate around the hole so as to make it possible to smoothly insert the spring pusher 57 into the movable holder 56.

The slider 60 includes an inserted portion 60a having a rectangular cross section which is inserted in the movable holder 56, and a sharp-pointed tip portion 60b projecting from the opening 56a of the front end of the movable holder. The graduated plate 61 having graduations 62 as indices is provided on the inserted portion 60a at the rear end thereof. Reference lines 58a, as indices for the graduations 62, are provided on the movable holder 56 at the sides of the longitudinal slot 58. The central graduation 62a is constituted by a marked groove colored in red, while the other graduations 62b are constituted by marked grooves colored in blue. The reference lines 58a are constituted by marked grooves colored in black. As a result, the colors of the graduations 62 and that of the reference lines 58a are convenient to read through the observation window 94 of the headlight body 2.

The zero point adjusting screw 66 is supported by the fixed holder 52 at the rear end thereof. The male threaded tip portion 67 of the screw 66 extends in the fixed holder 62 and is engaged in the tapped hole of the spring pusher 57 attached to the rear end of the movable holder 56. A snap ring 69 supports the screw 66 at the rear end of the fixed holder 52. The portion of the screw 66, which projects backward from the fixed holder 52, has a turning manipulation part 68 having a screwdriver engagement groove 68a. The screw 66 thus can be turned by a screwdriver to move the movable holder 56 backward and forward in the fixed holder 52. Since the slider 60 is pushed by the compressed helical spring 64 so that the tip of the slider is kept in contact with the reflector 4, the movable holder 56 can be moved backward and forward relative to the slider 60 so that the reference lines 58a on the movable holder are moved relative to the graduations 62 on the slider. For this reason, the zero point adjustment in which the positions of the reference lines 58a are made coincident with that of the zero point graduation 62a can be easily performed by turning the zero point adjusting screw 66.

Figure 5:
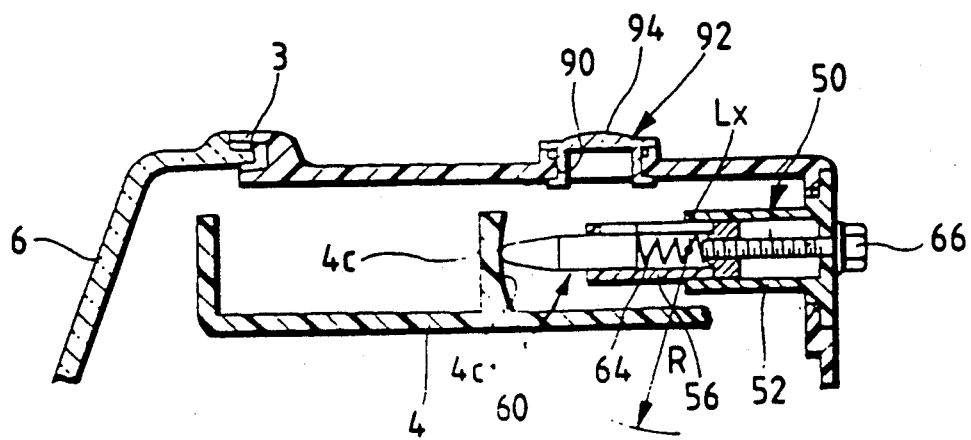
FIG. 5 is a vertical sectional view of the horizontal aiming device section of the headlight taken along a line V—V in FIG. 1.

As shown in FIG. 5, the slider tip contact surface 4c₁ of the vertical portion 4c of the reflector 4 is a curved surface (having a radius of curvature R), the center of curvature of which lies on the horizontal axis Lx. Therefore, when the reflector 4 is vertically swung about the horizontal axis Lx, the position of the slider 66 is not changed, that is, the graduations 62 of the first aiming device 50 are not displaced. It is designed so that the position of the zero point graduation 62a on the slider 66 coincides with those of the reference lines 58a when the horizontal angle of the reflector 4 is proper. For that reason, the graduation 62 whose position is coincident with those of the reference lines 58a indicates the horizontal angle of the reflector 4.

As shown in FIG. 5, the upper portion of the headlight body 2, which corresponds to the reference lines 58a for reading the graduations 62 on the slider 66, has a circular opening 90 fitted with a transparent cap 92 shaped as a cylinder closed at one end thereof. The opening 90 and the cap 92 constitute the observation window 94 including a convex lens whose top is a spherical surface. As a result, the magnified images of the graduations 62 and the reference lines 58a can be seen through the transparent observation window 94, thus permitting the graduations to be easily read.

The second aiming device 70 shown in FIGS. 1, 2, 3 and 10 is a level for measuring the vertical angle of the reflector 4, that is, the angle of the elevational direction of emission of light from the headlight. In the device 70, a straight air-bubble type level vial 80 integrally coupled with the inside of a lid 74 is housed in a level casing 72 integrally formed in the upper portion of the reflector 4. The lid 74 has an opening 76 in which the graduations 82 of the vial 80 are exposed. Shown at 82a is the zero point graduation of the vial 80. The vial 80 is disposed in the casing 72 so that the direction of the mutual juxtaposition of the graduations 82 intersect the horizontal axis Lx perpendicularly, and the vertical angle of the reflector 4 about the horizontal axis corresponds to the displacement of an air bubble 83 relative to the graduations. A vertical fastening screw 78 and a plate spring 79 are provided so that the position of the air bubble 83 in the vial 80 can be adjusted by turning the screw. The upper portion of the headlight body 2, which corresponds to the level 70, has an opening 90 fitted with a transparent cap 92. Since an observation window 94 constituted by the opening 90 and the cap 92 serves as a convex lens, the magnified image of the air bubble 83 in the vial 80 and the graduations 82 thereon can be easily seen to easily read the position of the air bubble, that is, easily read the vertical angle of the reflector 4 through the window.

A procedure of adjusting the first and second aiming devices 50 and 70 of the headlight attached to the body of the motor vehicle, and a procedure of adjusting the angle of the direction of emission of light from the headlight after the adjustment of the measuring devices are described hereinafter.

The headlight is designed so that the azimuthal direction of emission of light from the headlight prior to attachment to the vehicle body is proper when the position of the zero point graduation 62a on the slider 60 of the first aiming device 50 is coincident with those of the reference lines 58a, and the elevational direction of emission of light from the headlight is proper when the position of the air bubble 83 of the second aiming device 70 is coincident with that of the zero point graduation 82a of the device. Since the graduations of the first and second aiming devices 50 and 70 are generally not properly positioned initially due to various dimensional inaccuracies or the like when the headlight is attached to the vehicle body, the graduations need to be adjusted to their proper positions. For the adjustment of the positions of the graduations of the first measuring device 50, an optical aimer and the body of the vehicle are aligned facing each other, the adjusting screws 20 and 30 are turned to make the optical axis l of the headlight coincident with the axis of the vehicle, whereby the angle of the direction of emission of light from the headlight is made proper. At that time, the positions of the reference lines 58a and the zero point graduation 62a usually do not coincide with each other because of some dimensional inaccuracies of the headlight attaching surface of the vehicle body or the like. To correct for this, the zero point adjusting screw 66 is turned using a screwdriver to move the movable holder 60 backward or forward in the axial direction thereof to make the position of the zero point graduation 62a of the first aiming device 50 coincident with those of the reference lines 58a. The measuring device 50 is thus adjusted so that the graduation 62a whose position is coincident with those of the reference lines 58a indicates the zero point of the device when the angle of the azimuthal direction of emission of light from the headlight is proper. If the position of the air bubble 83 is not coincident with that of the zero point graduation 82a in the second aiming device 70 due to some dimensional inaccuracy of the headlight attaching surface of the vehicle body or the like, the clamping screw 78 is turned to adjust the measuring device to make the position of the air bubble coincident with that of the zero point graduation. The second aiming device 70 is thus adjusted so that the air bubble 83 indicates the zero point graduation 82a when the angle of the elevational direction of emission of light from the headlight is proper. Thereafter, the angle of the direction of emission of light from the headlight can be adjusted if necessary. If it is then found by observing the first and second aiming devices 50 and 70 through the observation windows 94 that the positions of the reference lines 58a of the first measuring device are not coincident with that of the zero point graduation 62a, and/or the position of the air bubble 83 of the second measuring device is not coincident with that of the zero point graduation 82a, the deviation of the horizontal angle of the reflector 4 and/or the deviation in the vertical angle of the reflector, that is, the deviation in the angle of the azimuthal direction of emission of light from the headlight and/or the deviation in the angle of the elevational direction of emission of the light therefrom are read in terms of the amounts of deviation from coincidence. Subsequently, the adjusting screw 20 and/or the adjusting screw 30 are turned to adjust the headlight so that the position of the zero point graduation 62a coincides with those of the reference lines 58a in the first measuring device and/or the position of the air bubble 83 coincides with that of the zero point graduation 82a in the second measuring device. The angles of the azimuthal and elevational directions of the emission of light from the headlight can thus be properly adjusted.

Although the observation windows 94 for reading the graduations and reference lines of the first aiming device 50 and the graduations and level vial of the second aiming device 70 are provided in the headlight body 2 in the above-described embodiment, the present invention is not confined thereto. For example, if the graduations, reference lines and air bubble of the level vial measuring devices can be observed through the front lens 6, observation windows may be provided in the non-stepped portion of the lens instead of the headlight body 2.

Figure 11:
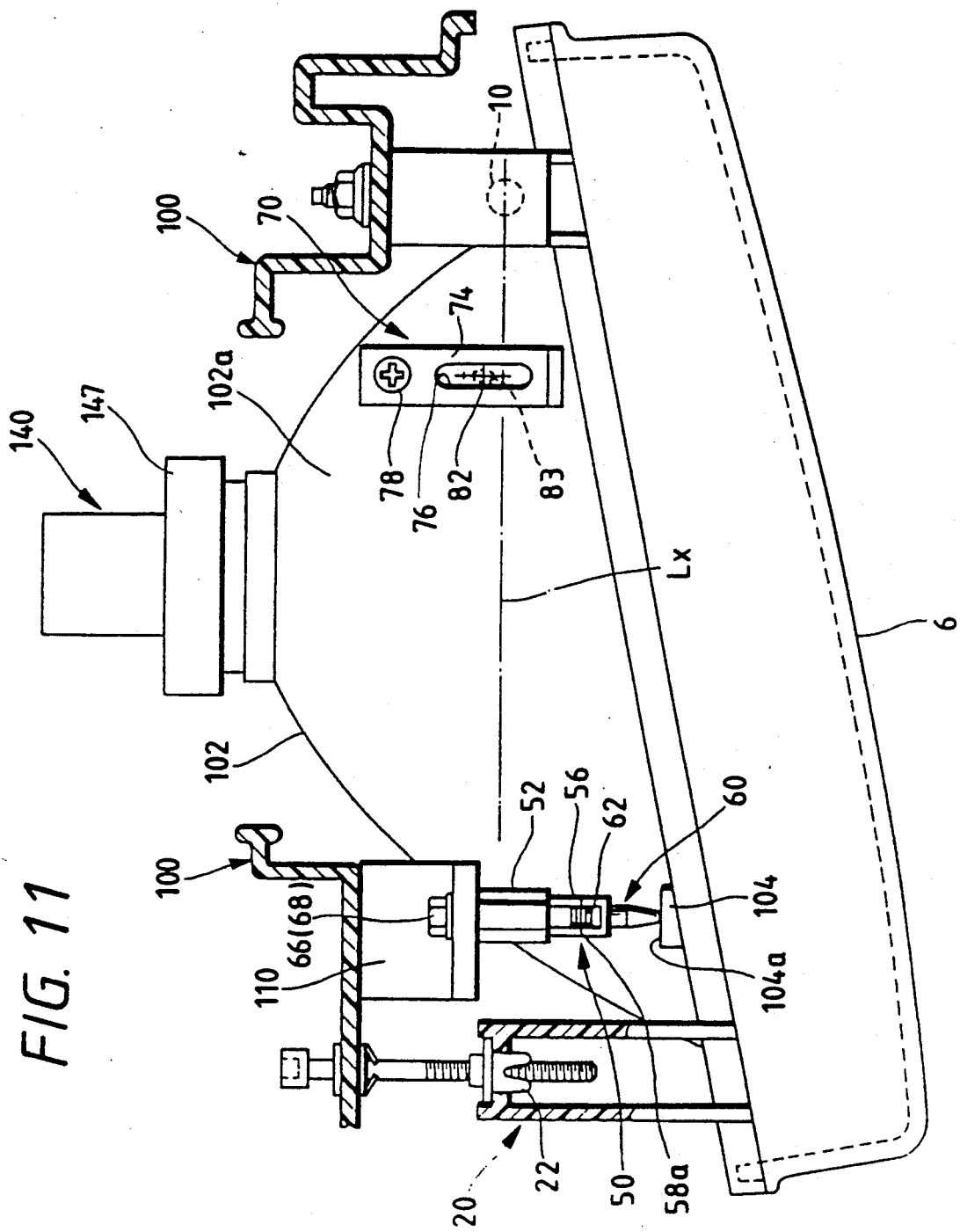
FIG. 11 is a plan view of a headlight constructed in accordance with another embodiment of the present invention, which has a light emission angle adjuster and is of the movable unit type.

FIG. 11 shows a second embodiment of the headlight. The headlight of the second embodiment is of the movable unit type in which the body and reflector of the headlight are integrated with each other as a body and reflector unit 102.

A first aiming device 50 for measuring the horizontal angle of the body and reflector unit 102 and a second aiming device 70, which is a level for measuring the vertical angle of the unit, are provided on the upper portion 102a of the wall of the unit so that the measuring devices are located on a horizontal plane containing a horizontal axis Lx. The first aiming device 50 is secured by a screw to a holder 110 attached to a headlight housing 100 so that the slider 60 of the measuring device is urged into contact with the upper projecting part 104 of the upper portion 102a of the wall of the body and reflector unit 102. The rod contact surface 104a of the vertical projecting part 104 is an arc-shaped surface, the center of curvature of which is on the horizontal axis Lx, so that the graduations of the second aiming device 50 are not displaced when the body and reflector unit 102 is vertically swung. The second aiming device 70 is secured to the upper portion 102a of the wall of the reflector and body unit 102 by a screw 78. The graduations of the first and second aiming devices 50 and 70 are provided in such locations that it is easy to see the graduations looking downward from above the headlight. A bulb socket 140 and a locking cap 147 for securing the socket in a socket hole are further provided in the headlight. The remaining construction of the headlight is the same as in the preceding embodiment. The equivalent elements of the two headlight are denoted by the same reference symbols in the drawings.

What is claimed is:

1. In a headlight for a motor vehicle of the movable reflector type in which a reflector is supported in a headlight body in such a manner that said reflector can be swung about a vertical axis and about a horizontal axis, an aiming device for measuring the angle of said reflector about said vertical axis provided between said body and said reflector comprising: a tubular fixed holder, a tubular movable holder, a spring disposed in said movable holder, a slider, and a movable holder position adjusting screw, said fixed holder being secured to said body and extending in the front-to-rear direction of said headlight, said movable holder being slidably inserted in said fixed holder and projecting forward from said fixed holder, said slider being inserted in said movable holder and pushed by said spring disposed in said movable holder so that a tip of said slider projects forward from said movable holder and is kept in contact with a rear surface of said reflector whereby said slider slides backward and forward in conjunction with the aiming of said reflector about said vertical axis, said screw being rotatably supported by said fixed holder, said screw having a male threaded tip portion disposed within said fixed holder and threadedly engaged in a tapped hole in said movable holder, and said screw having a rear end portion projecting backward from said fixed holder and having a turning manipulation part behind said fixed holder, a portion of said movable holder which projects forward from said fixed holder having a longitudinal slot formed therein, an index being provided on said portion of said movable holder at the side of said slot, and another index corresponding to said index being provided on a portion of said slider exposed in said slot, the aiming angle of said reflector about said vertical axis being indicated by an amount of offset between said indices.

2. The headlight for a motor vehicle according to claim 1, wherein said fixed holder is shaped as a tube of rectangular cross section, an opening being provided at a front end of said fixed holder, and further comprising a flange portion at an opposite end from said front end of said fixed holder.

3. The headlight for a motor vehicle according to claim 1, wherein said movable holder is shaped as a tube of rectangular cross section corresponding to said fixed holder, an opening being provided in the front end of said movable holder so that said tip of said slider projects from said opening.

4. The headlight for a motor vehicle according to claim 1, wherein said tip of said slider is curved, and wherein said rear surface portion has a center of curvature disposed on said horizontal axis and a radius of curvature determined such that the position of said slider is not displaced when said reflector is vertically swung about said horizontal axis.

5. The headlight for a motor vehicle according to claim 1, further comprising a transparent cap having a cylindrical portion and a magnifying lens portion, said transparent cap being fitted in an opening formed in an upper portion of said headlight body adjacent said indices.

6. The headlight for a motor vehicle according to claim 1, further comprising a graduated bubble-type level attached to said headlight body for measuring an amount of aiming angle of said headlight body around a horizontal axis.

7. In a headlight for a motor vehicle of the movable unit type in which a headlight body and reflector unit constituted by a mutually integrated body and reflector of said headlight is supported in a headlight housing in such a manner that said unit can be swung about a vertical axis and about a horizontal axis, an aiming device for measuring the aiming angle of said unit about said vertical axis provided between said housing and said unit comprising: a tubular fixed holder, a tubular movable holder, a spring disposed in said movable holder, a slider, and a movable holder position adjusting screw, said fixed holder being secured to said housing and extending in the front-to-rear direction of said headlight, said movable holder being inserted in said fixed holder and projecting at a tip of said movable holder forward from said fixed holder, said slider being inserted in said movable holder and being pushed by said spring disposed in said movable holder so that a tip of said slider projects forward from said movable holder and is kept in contact with a rear surface of said unit, whereby said slider slides backward and forward in conjunction with the aiming angle of said unit about said vertical axis, said screw being rotatably supported by said fixed holder, said screw having a male threaded tip portion disposed in said fixed holder, said screw being threadedly engaged in a tapped hole in said movable holder, and said screw having a rear end portion projecting backward from said fixed holder and having a turning manipulation part behind said fixed holder, a portion of said movable holder which projects forward from said fixed holder having a longitudinal slot formed therein, an index being provided on said portion of said movable holder at the side of said slot, and another index being provided on a portion of said slider exposed in said slot, the aiming angle of said unit about said vertical axis being indicated by an amount of offset between said indices.

8. The headlight for a motor vehicle according to claim 7, wherein said fixed holder is shaped as a tube of rectangular cross section, an opening being provided at a front end of said fixed holder, and further comprising a flange portion at an opposite end from said front end of said fixed holder.

9. The headlight for a motor vehicle according to claim 7, wherein said movable holder is shaped as a tube of rectangular cross section corresponding to said fixed holder, an opening being provided in the front end of said movable holder so that said tip of said slider projects from said opening.

10. The headlight for a motor vehicle according to claim 7, wherein said tip of said slider is curved, and wherein said rear surface portion has a center of curvature disposed on said horizontal axis and a radius of curvature determined such that the position of said slider is not displaced when said reflector is vertically swung about said horizontal axis.

11. The headlight for a motor vehicle according to claim 7, further comprising a graduated bubble-type level attached to said headlight body for measuring an aiming amount of said headlight body around a horizontal axis.

* * * * *